US011432676B2

(12) United States Patent
Huang (10) Patent No.: US 11,432,676 B2
(45) Date of Patent: Sep. 6, 2022

(54) COFFEE BREWING DEVICE

(71) Applicant: SUZHOU DR.COFFEE SYSTEM TECHNOLOGY CO., LTD, Jiangsu (CN)

(72) Inventor: Zicong Huang, Jiangsu (CN)

(73) Assignee: SUZHOU DR.COFFEE SYSTEM TECHNOLOGY CO., LTD, Suzhou (CN)

( * ) Notice: Subject to any disclaimer, the term of this patent is extended or adjusted under 35 U.S.C. 154(b) by 484 days.

(21) Appl. No.: 16/577,059

(22) Filed: Sep. 20, 2019

(65) Prior Publication Data

US 2020/0008608 A1 Jan. 9, 2020

Related U.S. Application Data

(63) Continuation of application No. PCT/CN2017/109213, filed on Nov. 3, 2017.

(30) Foreign Application Priority Data

Mar. 21, 2017 (CN) .......................... 201710169745.4

(51) Int. Cl.
*A47J 31/36* (2006.01)
*A47J 31/40* (2006.01)
*A47J 31/44* (2006.01)
*A47J 31/06* (2006.01)

(52) U.S. Cl.
CPC ......... *A47J 31/404* (2013.01); *A47J 31/3604* (2013.01); *A47J 31/3614* (2013.01); *A47J 31/0663* (2013.01); *A47J 31/4403* (2013.01)

(58) Field of Classification Search
CPC ................ A47J 31/3604; A47J 31/3609; A47J 31/3614; A47J 31/0663
USPC ......................................................... 99/302 P
See application file for complete search history.

(56) References Cited

U.S. PATENT DOCUMENTS

| | | | | |
|---|---|---|---|---|
| 5,259,296 A | * | 11/1993 | Mikael ................ | A47J 31/3614 99/287 |
| 2012/0055343 A1 | * | 3/2012 | Remo ................. | A47J 31/3614 99/289 P |
| 2014/0373724 A1 | * | 12/2014 | De'Longhi ......... | A47J 31/4403 99/289 R |

FOREIGN PATENT DOCUMENTS

| | | | |
|---|---|---|---|
| CN | 104053384 A | 9/2014 | |
| EP | 0486433 A1 * | 11/1991 | .......... A47J 31/3614 |
| WO | WO-2011150953 A1 * | 12/2011 | .......... A47J 31/3604 |

OTHER PUBLICATIONS

International Search Report of PCT Patent Application No. PCT/CN2017/109213 dated Feb. 1, 2018.

* cited by examiner

*Primary Examiner* — Reginald Alexander (57) ABSTRACT

The present invention discloses a coffee brewing device, which comprises a brewing head assembly, a powder box assembly, a screw assembly, a body fixing frame assembly, a movable frame assembly and a powder guide box assembly which are correspondingly provided. The present invention realizes the direction-variable movement of the powder box assembly in the movement process, and swings to corresponding positions for adding coffee powder, brewing, pushing out residues, scraping residues and realizing restoration.

8 Claims, 7 Drawing Sheets

COFFEE BREWING DEVICE

CROSS REFERENCE TO RELATED APPLICATIONS

The present application is a Continuation application of PCT Application No. PCT/CN2017/109213 filed on Nov. 3, 2017, which claims the benefit of Chinese Patent Application No. 201710169745.4 filed on Mar. 21, 2017. All the above are hereby incorporated by reference.

FIELD OF THE INVENTION

The present invention relates to a coffee brewing device, in particular to a fully automatic coffee machine.

BACKGROUND OF THE INVENTION

Up to now, there are many kinds of coffee brewing devices. When a screw assembly is used to drive a coffee box assembly to move, the movement trajectory of coffee box assembly is a one-segment linear or annular movement trajectory, which is relatively single.

SUMMARY OF THE INVENTION

The purpose of the present invention is to provide a coffee brewing device which can realize the direction-variable movement of a powder box assembly in a movement process, and swinging to corresponding positions for adding coffee powder, brewing, pushing out residues, scraping residues and realizing restoration.

The technical solution of the present invention is as follows: a coffee brewing device, comprising a brewing head assembly, a powder box assembly, a screw assembly, a body fixing frame assembly, a movable frame assembly and a powder guide box assembly which are correspondingly provided, wherein the body frame assembly comprises a left body fixing frame on the left side and a right body fixing frame on the right side, a direction-variable first movement trajectory is provided on the left body fixing frame, the first movement trajectory comprises two or more segments of movement trajectory structures, the left body fixing frame is in an integral structural form or a multi-piece structural form, a direction-variable second movement trajectory is provided on the right body fixing frame, the second movement trajectory comprises two or more segments of movement trajectory structures, the right body fixing frame is in an integral structural form or a multi-piece structural form, the left body fixing frame and the right body fixing frame are separate independent structures or an integral structure, and the left body fixing frame and the right body fixing frame jointly realize the direction-variable movement of the powder box assembly, the swinging of the powder box assembly, the movement for adding coffee powder, the movement for pressing coffee powder for brewing, the movement for pushing out residues and the movement for scraping residues.

In one preferred embodiment of the present invention, the first movement trajectory comprises a first powder box trajectory, a first residue pushing-out shaft trajectory and a first supporting frame trajectory, points at which the first powder box trajectory is bent from top to bottom are respectively a powder pressing top end A1, a powder box swinging start point B1, a powder box swinging outermost point C1, a residue scraping start point D1 and a residue scraping end point E1, the first residue pushing-out shaft trajectory comprises a residue pushing-out shaft highest point F1 and a residue pushing-out shaft lowest point G1, the first supporting frame trajectory comprises a supporting frame highest point H1 and a supporting frame lowest point I1, the second movement trajectory comprises a second powder box trajectory, a second residue pushing-out shaft trajectory, a second supporting frame trajectory and a residue scraping inclined surface trajectory, points at which the second powder box trajectory is bent from top to bottom are respectively powder pressing top end A2, a powder box swinging start point B2, a powder box swinging outermost point C2, a residue scraping start point D2 and a residue scraping end point E2, the second residue pushing-out shaft trajectory comprises a residue pushing-out shaft highest point F2 and a residue pushing-out shaft lowest point G2, the second supporting frame trajectory comprises a supporting frame highest point H2 and a supporting frame lowest point I2, and the residue scraping inclined surface trajectory comprises a residue scraping inclined surface contact start point J2 and a residue scraping inclined surface contact end point K2.

In one preferred embodiment of the present invention, the first powder box trajectory is a direction-variable trajectory for realizing the swinging and linear movement of the powder box assembly; and the second powder box trajectory is a direction-variable trajectory for realizing the swinging and linear movement of the powder box assembly.

In one preferred embodiment of the present invention, on the first powder box trajectory, the position from the powder pressing top end A1 to the powder box swinging start point B1 is a trajectory position for realizing powder pressing of the powder box assembly and coffee brewing; the position from the powder box swinging start point B1 to the powder box swinging outermost point C1 is a trajectory position for realizing the swinging of the powder box assembly to a position for adding coffee powder; on the second powder box trajectory, the position from the powder pressing top end A2 to the powder box swinging start point B2 is a trajectory position for realizing powder pressing of the powder box assembly and coffee brewing; the position from the powder box swinging start point B2 to the powder box swinging outermost point C2 is a trajectory position for realizing swinging of the powder box assembly to a position for adding coffee powder.

In one preferred embodiment of the present invention, on the first powder box trajectory, the position from the powder box swinging outermost point C1 to the residue scraping start point D1 is a trajectory position for realizing residue pushing-out of the powder box assembly; the position from the residue scraping start point D1 to the residue scraping end point E1 is a trajectory position for realizing residue scraping of the powder box assembly; on the second powder box trajectory, the position from the powder box swinging outermost point C2 to the residue scraping start point D2 is a trajectory position for realizing residue pushing-out of the powder box assembly; and the residue scraping start point D2 to the residue scraping end point E2 is a trajectory position for realizing residue scraping of the powder box assembly.

In one preferred embodiment of the present invention, on the first residue pushing-out shaft trajectory, the position from the residue pushing-out shaft highest point F1 to the residue pushing-out shaft lowest point G1 is a trajectory position for realizing residue pushing-out of a residue pushing-out shaft and a residue pushing-out rod; on the second residue pushing-out shaft trajectory, the position from the residue pushing-out shaft highest point F2 to the residue pushing-out shaft lowest point G2 is a trajectory position for realizing residue pushing-out of the residue pushing-out shaft and the residue pushing-out rod.

In one preferred embodiment of the present invention, on the first supporting frame trajectory, the position from the supporting frame highest point H1 to the supporting frame lowest point I1 is a trajectory position for realizing that a supporting frame indirectly or directly drives the powder box assembly to move; on the second supporting frame trajectory, the position from the supporting frame highest point H2 to the supporting frame lowest point I2 is a trajectory position for realizing that the supporting frame indirectly or directly drives the powder box assembly to move.

In one preferred embodiment of the present invention, on the residue scraping inclined surface trajectory, the position from the residue scraping inclined surface contact start point J2 to the residue scraping inclined surface contact end point K2 is a trajectory position for realizing residue scraping of a residue scraper.

In one preferred embodiment of the present invention, a residue scraping spring is mounted between the powder box of the powder box assembly and the residue scraper.

The present invention is a coffee brewing device, which realizes the direction-variable movement of the powder box assembly in the movement process, and swings to corresponding positions for adding coffee powder, brewing, pushing out residues, scraping residues and realizing restoration.

DESCRIPTION OF THE EMBODIMENTS

The preferred embodiments of the present invention will be described in detail below such that the advantages and features of the present invention can be more easily understood by one skilled in the field, and thus the scope of protection of the present invention can be defined more clearly.

The present invention provides a coffee brewing device. As illustrated in FIG. 1 to FIG. 7, the coffee brewing device comprises a brewing head assembly 01, a powder box assembly 02, a screw assembly 03, a body fixing frame assembly 04, a movable frame assembly 05 and a powder guide box assembly 06. The brewing head assembly 01 and the powder box assembly 02 are provided on the front side in the body fixing frame assembly 04 and are provided corresponding to each other from top to bottom. The powder guide box assembly 06 is provided on the outer surface of the front side of the body fixing frame assembly 04 and is provided corresponding to the powder box assembly 02. The screw assembly 03 is provided on the rear side in the body fixing frame assembly 04. The body fixing frame assembly 04 is provided on the two sides of the housing of the coffee brewing device. The body fixing frame assembly 04 comprises a left body fixing frame 0415 and a right body fixing frame assembly 0418. The movable frame assembly 05 is provided on the screw assembly 03 and is provided corresponding to the powder box assembly 02, the left body fixing frame 0415 and the right body fixing frame 0418. The powder box assembly 02 is provided respectively corresponding to the left body fixing frame 0415 and the right body fixing frame 0418. A multi-segment bent first powder box trajectory 04151, and a first residue pushing-out shaft trajectory 04152 and a first supporting frame trajectory 04153 which are longitudinally provided, are provided on the left body fixing frame 0415. A multi-segment bent second powder box trajectory 04181, a second residue pushing-out shaft trajectory 04182 and a second supporting frame trajectory 04183 which are longitudinally provided, and a residue scraping inclined surface trajectory 04184 are provided on the right body fixing frame 0418. The first powder box trajectory 04151, the first residue pushing-out shaft trajectory 04152 and the first supporting frame trajectory 04153 are provided corresponding to the second powder box trajectory 04181, the second residue pushing-out shaft trajectory 04182 and the second supporting frame trajectory 04183.

Figure 7:
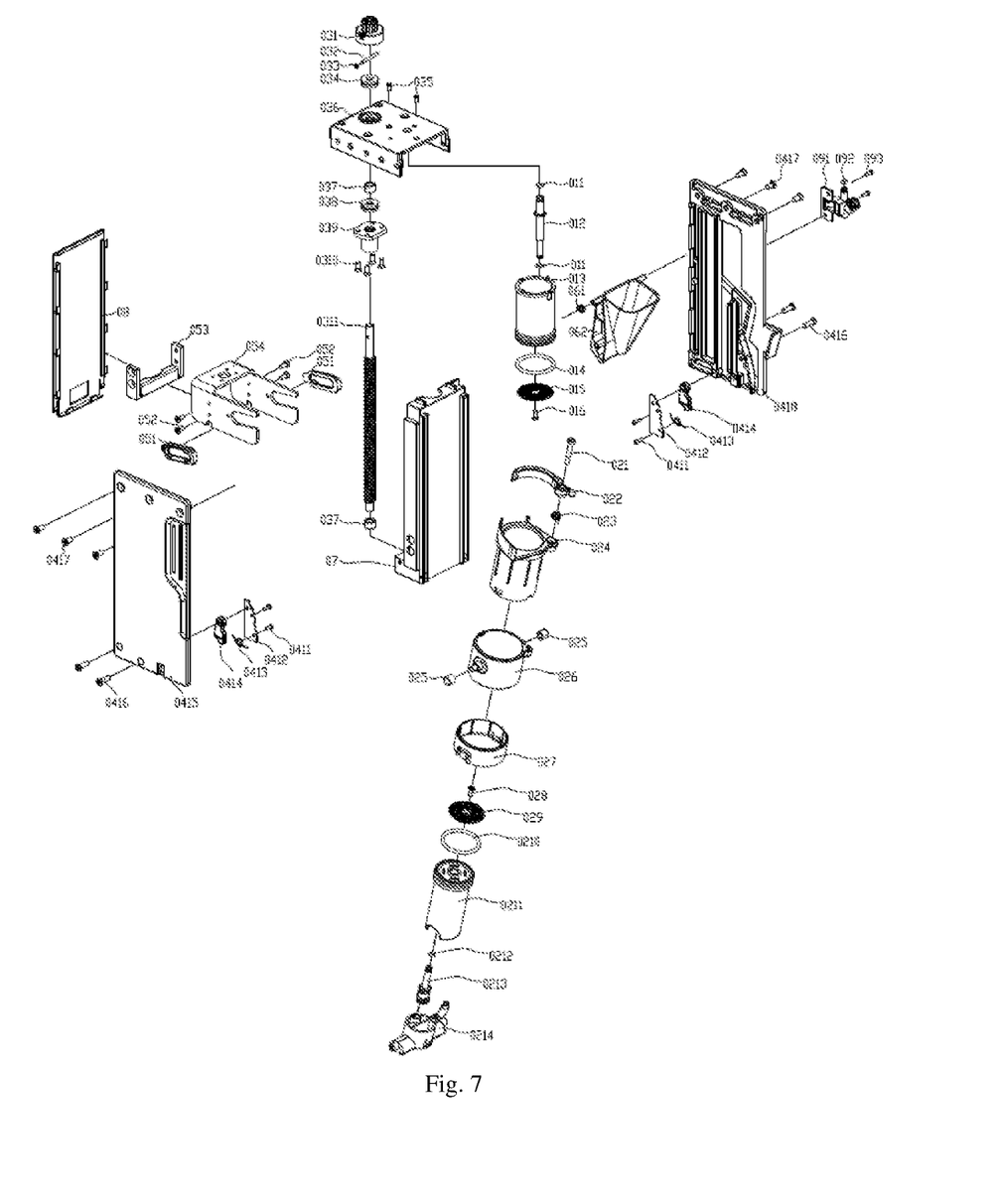
FIG. 7 is an exploded view of a coffee brewing device in one preferred embodiment of the present invention.

The brewing head assembly 01 comprises an outlet joint 011, a sealing ring 012, an outlet spring 013, an outlet plug 014, a brewing head 015, a brewing head sealing ring 016 and a filter screen 017 which are provided sequentially and correspondingly, and realizes the functions of pressing coffee powder and brewing coffee.

The powder box assembly 02 comprises a residue scraper screw 021, a residue scraper 022, a residue scraping torsional spring 022 residue scraping torsional spring 023, a powder box 024, a powder box support wear-resistant sleeve 025, a powder box support 026, a powder box support locking sleeve 027, a residue pushing-out rod screw 028, a residue pushing-out rod filter screen 029, a residue pushing-out rod sealing ring 0210, a residue pushing-out rod 0211, a sealing ring 0212, an inlet joint 0213 and a residue pushing-out shaft 0214 which are provided sequentially in a combined manner, and realizes the functions of loading coffee powder and brewing coffee.

The screw assembly 03 comprises a connector 031, a limiting pin 032, a limiting clamp spring 033, a bearing 034, a brewing head locking screw 035, an upper fixing frame 036, a shaft sleeve 037, a bearing 038, a nut 039, a screw 0310 and a screw 0311 which are provided sequentially in a combined manner, and realizes the swinging of the powder box assembly 02.

The body fixing frame assembly 04 comprises a left body fixing frame 0415, a first powder box trajectory 04151, a first residue pushing-out shaft trajectory 04152, a first supporting frame trajectory 04153, a right body fixing frame 0418, a second powder box trajectory 04181, a second residue pushing-out shaft trajectory 04182, a second supporting frame trajectory 04183, a screw 0411, a restoration pressing block 0412, a restoration pressing block torsional spring 0413, a restoration block 0414, a screw 0416 and a screw 0417; and realizes the swinging of the powder box assembly 02, the movement of the residue pushing-out rod 0211, the residue scraping movement of the residue scraper 022 and the up-down movement of the movable frame assembly 05.

The movable frame assembly 05 comprises a stop rail 051, a friction-resistant piece 052, a supporting frame 053 and a movable frame 054 which are provided correspondingly; and realizes the swinging of the powder box assembly 02 and the connection with the body fixing frame assembly 04.

The powder guide box assembly 06 comprises a clamp spring 061 and a powder guide box 062 which are provided sequentially and correspondingly; and realizes the direction guide of the coffee powder from a coffee grinder to the powder box.

A baffle 07 is provided between the screw assembly 03 and the powder box assembly 02, and the baffle 07 can realize the function of separating coffee powder and coffee residues from the screw 0311 and the nut 039, thus preventing coffee powder and coffee residues from entering the screw 0311 and the nut 039 and affecting the smoothness of transmission.

A rear cover 08 is further provided between the left body fixing frame 0415 and the right body fixing frame 0418, and the rear cover 08 realizes the function of preventing the screw 0311 and the nut 039 from being contaminated.

Figure 1:
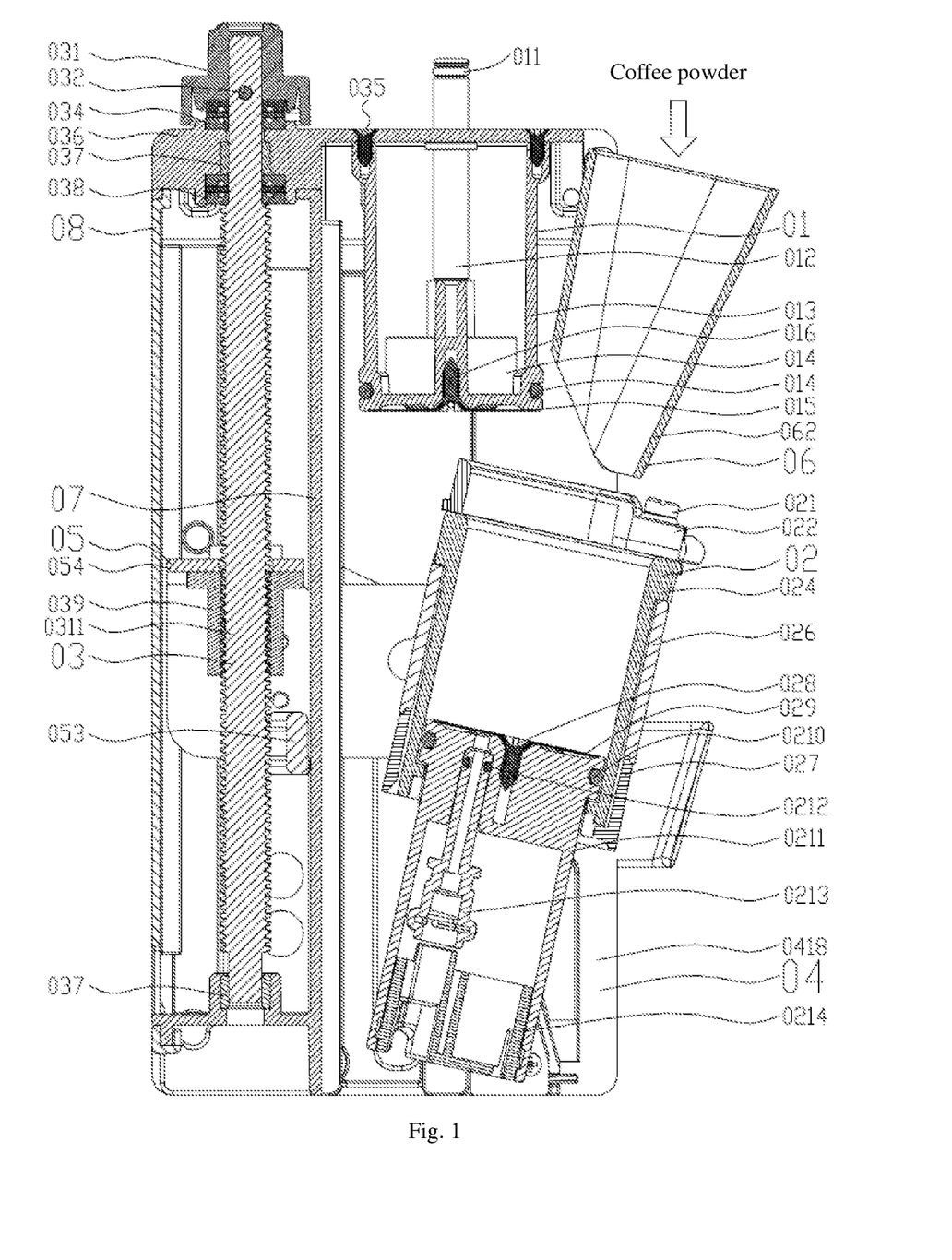
FIG. 1 is a cross-sectional view of a coffee brewing device in a state of being ready to add powder in one preferred embodiment of the present invention.
Figure 2:
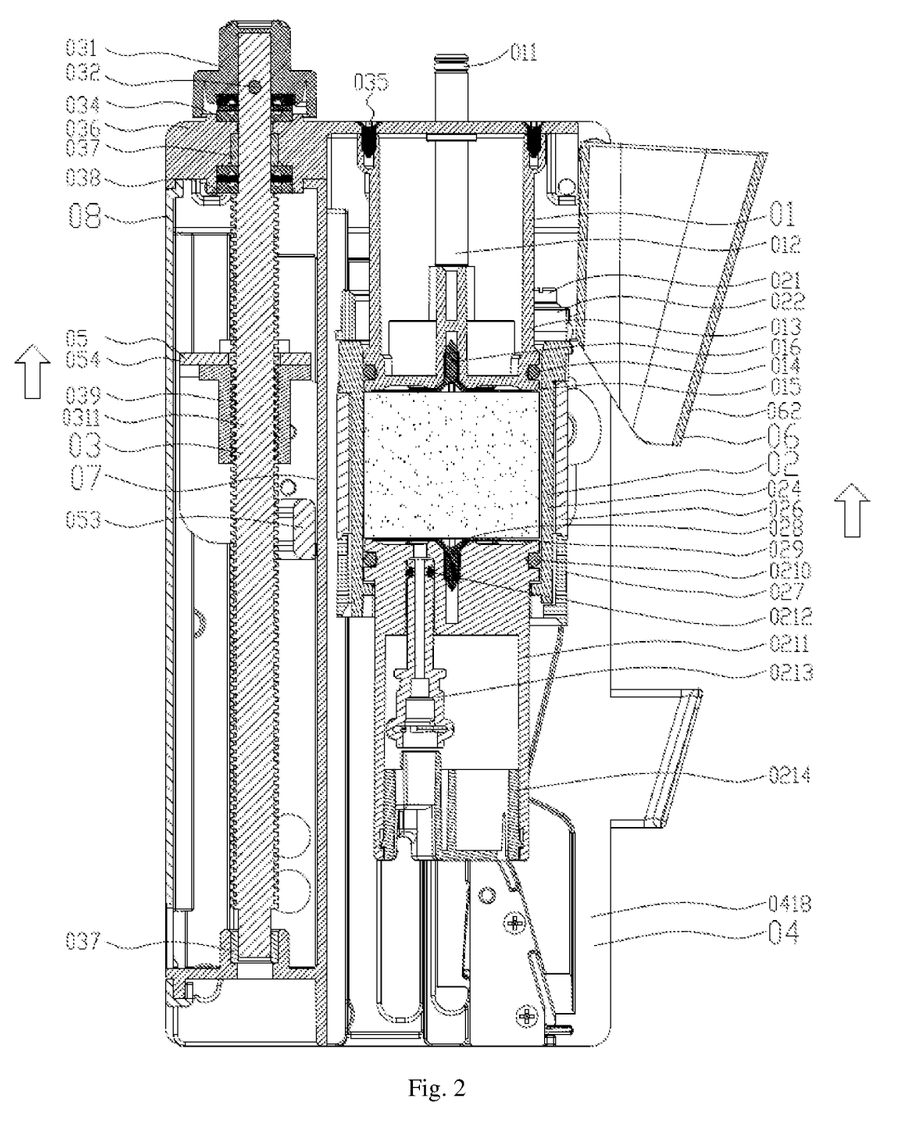
FIG. 2 is a cross-sectional view of a coffee brewing device in a state of pressing powder for brewing in one preferred embodiment of the present invention.
Figure 3:
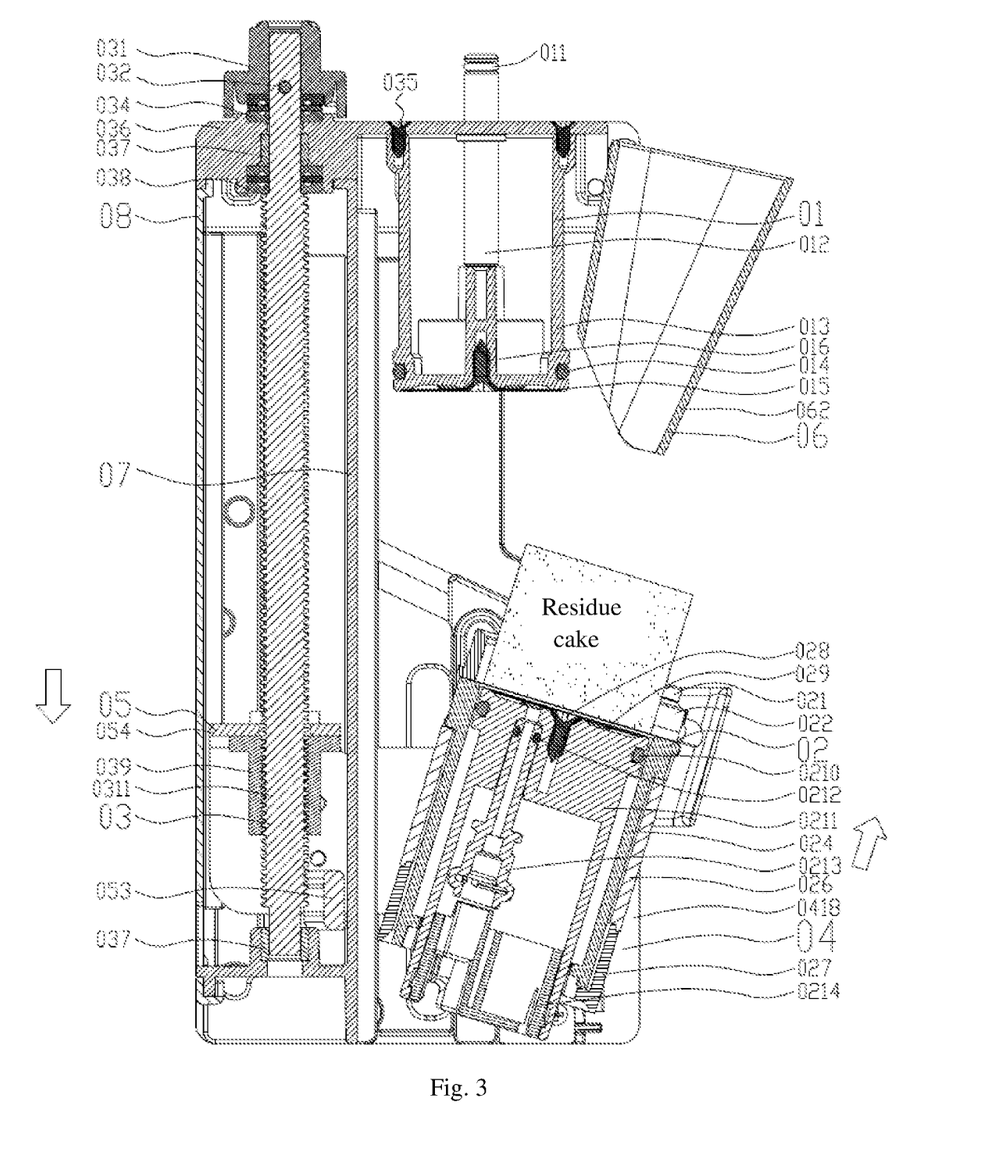
FIG. 3 is a cross-sectional view of a coffee brewing device in a state of pushing out residues in one preferred embodiment of the present invention.
Figure 4:
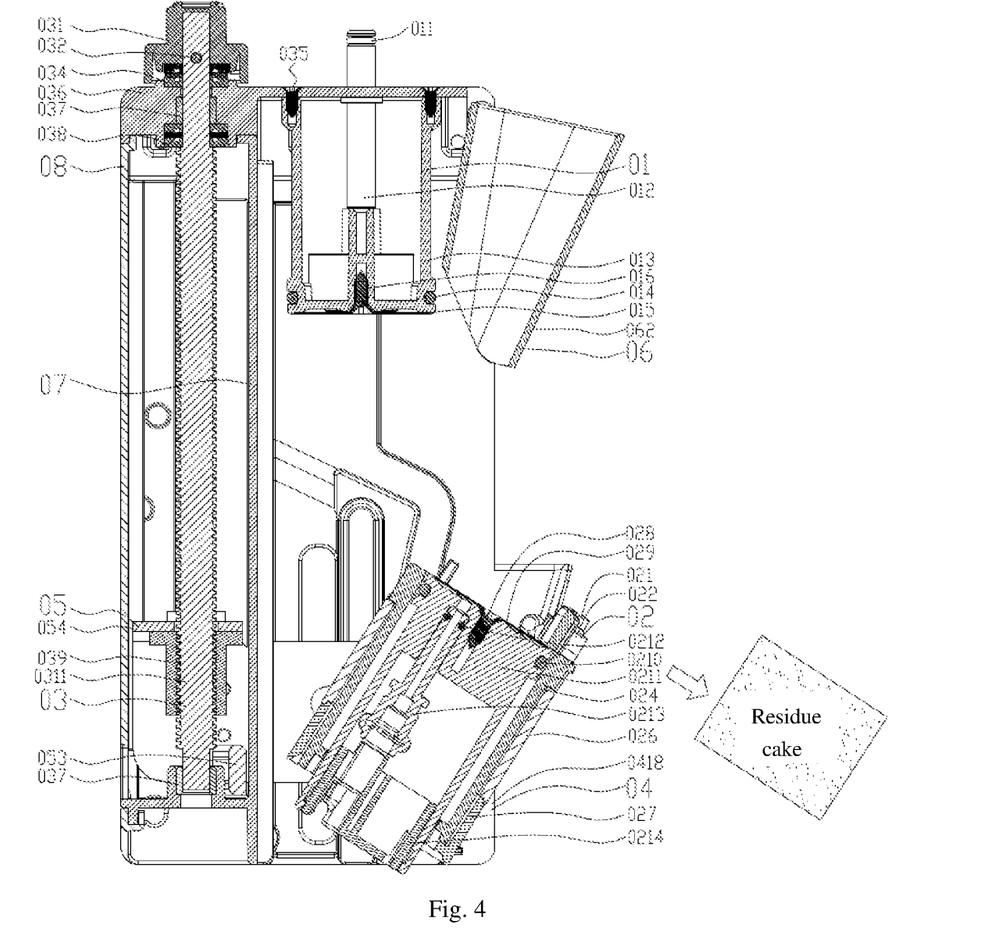
FIG. 4 is a cross-sectional view of a coffee brewing device in a state of scraping residues in one preferred embodiment of the present invention.
Figure 5:
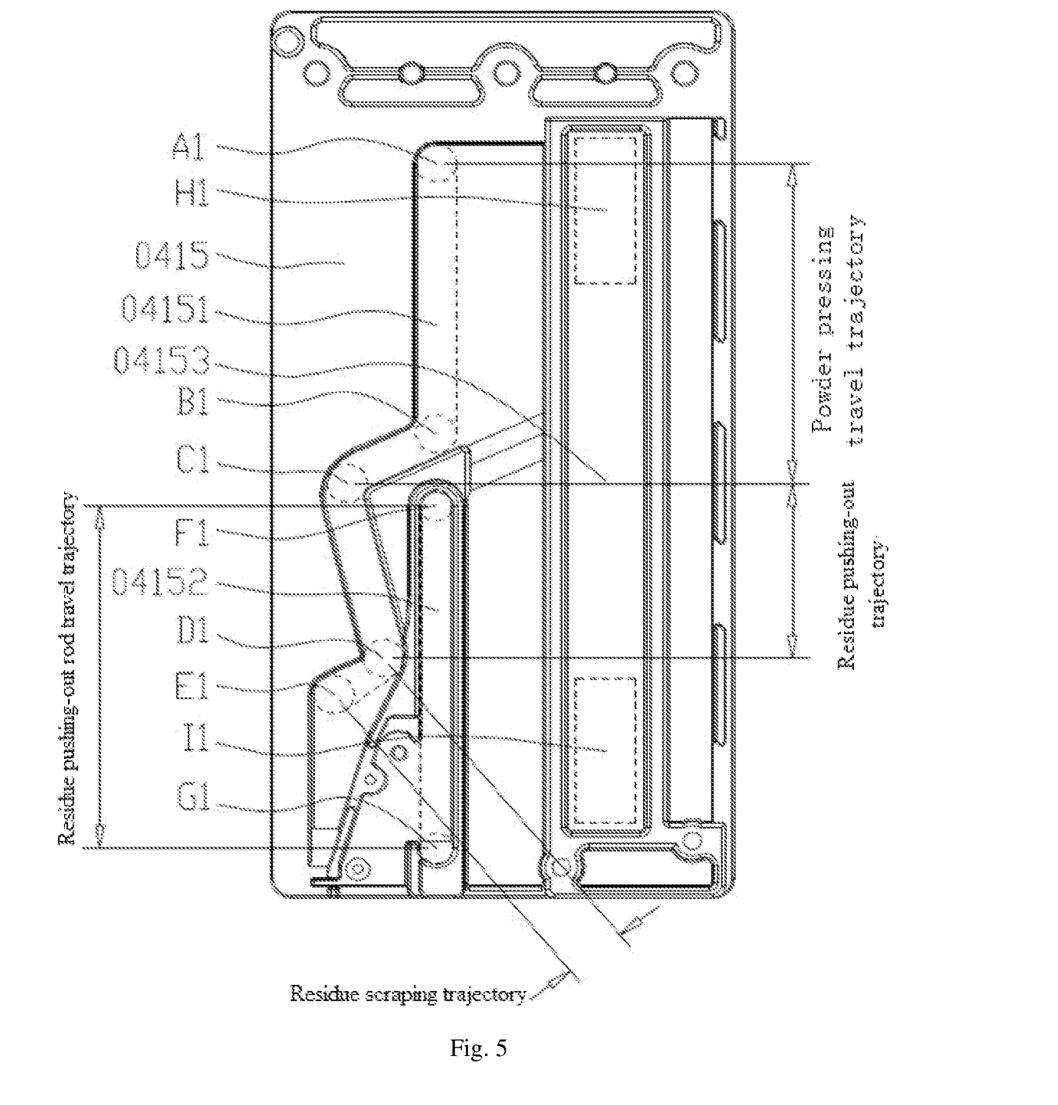
FIG. 5 is a first movement trajectory diagram of a left body fixing frame of a coffee brewing device in one preferred embodiment of the present invention.

As illustrated in FIG. 5, the left body fixing frame 0415 comprises a first powder box trajectory 04151, a first residue pushing-out shaft trajectory 04152, and a first supporting frame trajectory 04153. Points at which the first powder box trajectory 04151 is bent from top to bottom are respectively a powder pressing top end A1, a powder box swinging start point B1, a powder box swinging outermost point C1, a residue scraping start point D1 and a residue scraping end point E1. The first residue pushing-out shaft trajectory 04152 comprises a residue pushing-out shaft highest point F1 and a residue pushing-out shaft lowest point G1. The first supporting frame trajectory 04153 comprises a supporting frame highest point H1 and a supporting frame lowest point I1.

The trajectory positions of the first powder box trajectory 04151 are as follows: the position from the powder pressing top end A1 to the powder box swinging start point B1 is a trajectory position for realizing powder pressing of the powder box assembly 02 and coffee brewing; the position from the powder box swinging start point B1 to the powder box swinging outermost point C1 is a trajectory position for realizing the swinging of the powder box assembly 02 to a position for adding coffee powder; the position from the powder box swinging outermost point C1 to the residue scraping start point D1 is a trajectory position for realizing residue pushing-out of the powder box assembly 02; the position from the residue scraping start point D1 to the residue scraping end point E1 is a trajectory position for realizing residue scraping of the powder box assembly 02; the position from the residue pushing-out shaft highest point F1 to the residue pushing-out shaft lowest point G1 is a trajectory position for realizing residue pushing-out of a residue pushing-out shaft 0214 and a residue pushing-out rod 0211; the position from the supporting frame highest point H1 to the supporting frame lowest point I1 is a trajectory position for realizing that a supporting frame 053 indirectly or directly drives the powder box assembly 02 to move.

Figure 6:
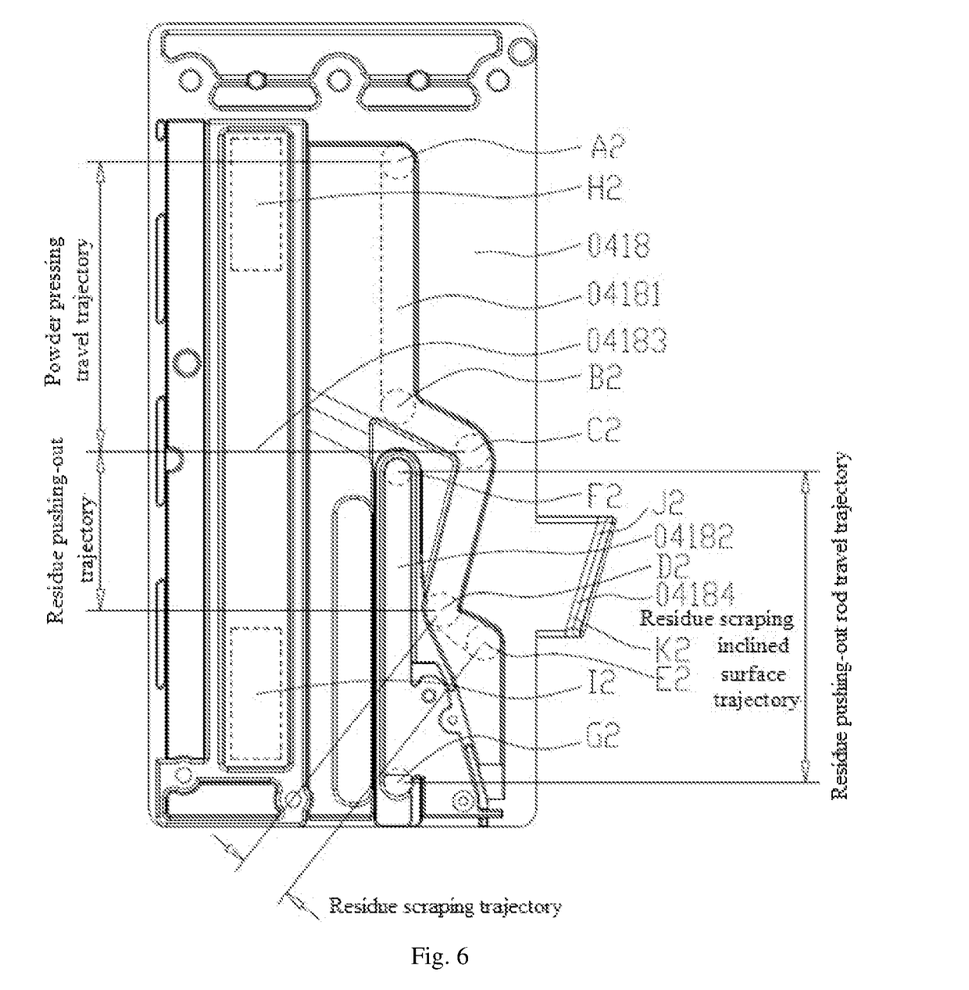
FIG. 6 is a second movement trajectory diagram of a right body fixing frame of a coffee brewing device in one preferred embodiment of the present invention.

As illustrated in FIG. 6, the right body fixing frame 0418 comprises a second powder box trajectory 04181, a second residue pushing-out shaft trajectory 04182, a second supporting frame trajectory 04183 and a residue scraping inclined surface trajectory 04184. Points at which the second powder box trajectory 04181 is bent from top to bottom are respectively powder pressing top end A2, a powder box swinging start point B2, a powder box swinging outermost point C2, a residue scraping start point D2 and a residue scraping end point E2, the second residue pushing-out shaft trajectory 04182 comprises a residue pushing-out shaft highest point F2 and a residue pushing-out shaft lowest point G2, the second supporting frame trajectory 04183 comprises a supporting frame highest point H2 and a supporting frame lowest point I2, and the residue scraping inclined surface trajectory 04184 comprises a residue scraping inclined surface contact start point J2 and a residue scraping inclined surface contact end point K2.

The trajectory positions of the second powder box trajectory 0441 are as follows: the position from the powder pressing top end A2 to the powder box swinging start point B2 is a trajectory position for realizing powder pressing of the powder box assembly 02 and coffee brewing; the position from the powder box swinging start point B2 to the powder box swinging outermost point C2 is a trajectory position for realizing swinging of the powder box assembly 02 to a position for adding coffee powder; the position from the powder box swinging outermost point C2 to the residue scraping start point D2 is a trajectory position for realizing residue pushing-out of the powder box assembly 02; the residue scraping start point D2 to the residue scraping end point E2 is a trajectory position for realizing residue scraping of the powder box assembly 02; the position from the residue pushing-out shaft highest point F2 to the residue pushing-out shaft lowest point G2 is a trajectory position for realizing residue pushing-out of the residue pushing-out shaft 0214 and the residue pushing-out rod 0211; the position from the supporting frame highest point H2 to the supporting frame lowest point I2 is a trajectory position for realizing that the supporting frame 053 indirectly or directly drives the powder box assembly 02 to move; the position from the residue scraping inclined surface contact start point J2 to the residue scraping inclined surface contact end point K2 is a trajectory position for realizing residue scraping of a residue scraper 022.

The movement and working principle of the coffee brewing device is as follows: the connector 031 is connected with the motor or the rotating part driven by the motor to provide the power source of the coffee brewing device; the connector 031 is connected with the screw 0311 to realize the rotation of the screw 0311; the rotation of the screw 0311 drives the nut 039 to move up and down; the nut 039 is rigidly connected with the movable frame 054 to drive the supporting frame 053 to move up and down along the first supporting frame trajectory 04153 and the second supporting frame trajectory 04183; and the upward and downward movement of the movable frame 054 drives the powder box assembly 02 to move along the first powder box trajectory 04151 and the second powder box trajectory 04181, so as to realize the movement of the powder box assembly 02 to the positions required for adding powder, pressing powder, brewing, pushing out residues and scraping residues; the movement of the powder box assembly 02 realizes the residue pushing-out movement of the residue pushing-out rod 0211 and residue pushing-out shaft 0214, and the residue pushing-out shaft 0214 moves along the first residue pushing-out shaft trajectory 04152 and the second residue pushing-out shaft trajectory 04182 to realize the residue pushing-out movement and restoration; the movement of the powder box assembly 02 realizes the movement of the residue scraper 022 along the residue scraping inclined surface trajectory, and the position from the residue scraping inclined surface contact start point J2 to the residue scraping inclined surface contact end point K2 is the residue scraping trajectory of the residue scraper 022.

The present invention relates to a coffee brewing device, which can realize the direction-variable movement of the powder box assembly in the movement process, and swinging to corresponding positions for adding coffee powder, brewing, pushing out residues, scraping residues and realizing restoration.

The above embodiments are only specific embodiments of the present invention, but the scope of protection of the present invention is not limited thereto. Variations or replacements that can be conceived by any one skilled in the art without contributing any inventive labor within the technical scope disclosed in the present invention shall be covered in the scope of protection of the present invention. Therefore, the scope of protection of the present invention should be based on the scope of protection defined by the claims.

What is claimed is:

1. A coffee brewing device, comprising a brewing head assembly, a powder box assembly, a screw assembly, a body fixing frame assembly, a movable frame assembly and a powder guide box assembly which are correspondingly provided, wherein the body fixing frame assembly comprises a left body fixing frame on the left side and a right body fixing frame on the right side, a direction-variable first movement trajectory is provided on the left body fixing frame, the first movement trajectory comprises two or more segments of movement trajectory, the left body fixing frame is in an integral structural form or a multi-piece structural form, a direction-variable second movement trajectory is provided on the right body fixing frame, the second movement trajectory comprises two or more segments of movement trajectory, the right body fixing frame is in an integral structural form or a multi-piece structural form, and the left body fixing frame and the right body fixing frame jointly realize the direction-variable movement of the powder box assembly, the swinging of the powder box assembly, the movement for adding coffee powder, the movement for pressing coffee powder for brewing, the movement for pushing out residues and the movement for scraping residues, wherein the first movement trajectory comprises a first powder box trajectory, a first residue pushing-out shaft trajectory and a first supporting frame trajectory, points at which the first powder box trajectory is bent from top to bottom are respectively a powder pressing top end A1, a powder box swinging start point B1, a powder box swinging outermost point C1, a residue scraping start point D1 and a residue scraping end point E1, the first residue pushing-out shaft trajectory comprises a residue pushing-out shaft highest point F1 and a residue pushing-out shaft lowest point G1, the first supporting frame trajectory comprises a supporting frame highest point H1 and a supporting frame lowest point I1, the second movement trajectory comprises a second powder box trajectory, a second residue pushing-out shaft trajectory, a second supporting frame trajectory and a residue scraping inclined surface trajectory, points at which the second powder box trajectory is bent from top to bottom are respectively powder pressing top end A2, a powder box swinging start point B2, a powder box swinging outermost point C2, a residue scraping start point D2 and a residue scraping end point E2, the second residue pushing-out shaft trajectory comprises a residue pushing-out shaft highest point F2 and a residue pushing-out shaft lowest point G2, the second supporting frame trajectory comprises a supporting frame highest point H2 and a supporting frame lowest point I2, and the residue scraping inclined surface trajectory comprises a residue scraping inclined surface contact start point J2 and a residue scraping inclined surface contact end point K2.

2. The coffee brewing device according to claim 1, wherein the first powder box trajectory is a direction-variable trajectory for realizing the swinging and linear movement of the powder box assembly; and the second powder box trajectory is a direction-variable trajectory for realizing the swinging and linear movement of the powder box assembly.

3. The coffee brewing device according to claim 1, wherein, on the first powder box trajectory, the position from the powder pressing top end A1 to the powder box swinging start point B1 is a trajectory position for realizing powder pressing of the powder box assembly and coffee brewing; the position from the powder box swinging start point B1 to the powder box swinging outermost point C1 is a trajectory position for realizing the swinging of the powder box assembly to a position for adding coffee powder; on the second powder box trajectory, the position from the powder pressing top end A2 to the powder box swinging start point B2 is a trajectory position for realizing powder pressing of the powder box assembly and coffee brewing; the position from the powder box swinging start point B2 to the powder box swinging outermost point C2 is a trajectory position for realizing swinging of the powder box assembly to a position for adding coffee powder.

4. The coffee brewing device according to claim 1, wherein, on the first powder box trajectory, the position from the powder box swinging outermost point C1 to the residue scraping start point D1 is a trajectory position for realizing residue pushing-out of the powder box assembly; the position from the residue scraping start point D1 to the residue scraping end point E1 is a trajectory position for realizing residue scraping of the powder box assembly; on the second powder box trajectory, the position from the powder box swinging outermost point C2 to the residue scraping start point D2 is a trajectory position for realizing residue pushing-out of the powder box assembly; and the residue scraping start point D2 to the residue scraping end point E2 is a trajectory position for realizing residue scraping of the powder box assembly.

5. The coffee brewing device according to claim 1, wherein, on the first residue pushing-out shaft trajectory, the position from the residue pushing-out shaft highest point F1 to the residue pushing-out shaft lowest point G1 is a trajectory position for realizing residue pushing-out of a residue pushing-out shaft and a residue pushing-out rod; on the second residue pushing-out shaft trajectory, the position from the residue pushing-out shaft highest point F2 to the residue pushing-out shaft lowest point G2 is a trajectory position for realizing residue pushing-out of the residue pushing-out shaft and the residue pushing-out rod.

6. The coffee brewing device according to claim 1, wherein, on the first supporting frame trajectory, the position from the supporting frame highest point H1 to the supporting frame lowest point I1 is a trajectory position for realizing that a supporting frame indirectly or directly drives the powder box assembly to move; on the second supporting frame trajectory, the position from the supporting frame highest point H2 to the supporting frame lowest point I2 is a trajectory position for realizing that the supporting frame indirectly or directly drives the powder box assembly to move.

7. The coffee brewing device according to claim 1, wherein, on the residue scraping inclined surface trajectory, the position from the residue scraping inclined surface contact start point J2 to the residue scraping inclined surface contact end point K2 is a trajectory position for realizing residue scraping of a residue scraper.

8. The coffee brewing device according to claim 7, wherein a residue scraping torsional spring is provided between the powder box of the powder box assembly and the residue scraper.

* * * * *